UNITED STATES PATENT OFFICE.

HENRY PEMBERTON, OF PHILADELPHIA, PENNSYLVANIA.

IMPROVEMENT IN MAKING SODA-ASH AND CARBONATES OF SODA.

Specification forming part of Letters Patent No. 9,346, dated October 19, 1852.

*To all whom it may concern:*

Be it known that I, HENRY PEMBERTON, of the city and county of Philadelphia, and State of Pennsylvania, have invented or discovered a new and useful Process in the Manufacture of Soda-Ash and other Preparations of Carbonate of Soda; and I do hereby declare the following to be a full, clear, and exact description of the said process, so that any person skilled in the art or science to which it appertains may make, compound, and use the same.

I take sulphate of soda, as obtained by any of the known processes, and reduce it to a coarse powder, which I mix with about half its weight of powdered coal, charcoal, sawdust, or other combustible matter. This mixture I subject to a low red heat in a suitable furnace until the mass is melted and thoroughly decomposed into sulphuret of sodium. It is then withdrawn from the furnace, and when cool enough dissolved in water and run into suitable air-tight vats provided with pipes, stop-cocks, and connected with each other in the manner known among chemists as "Woulfe's apparatus," and which vats, for greater convenience, are placed one above another. I then force, by an air-pump or other suitable means, carbonic acid through the liquids in the series of vats, entering the lowest one first. The carbonic acid I obtain from escape gases from the chimney or other parts of furnaces burning anthracite or other coal, but in preference from the chimneys of steam-boilers. I first pass the gases through water in a suitable vessel to remove ashes, smoke, or other dirt. A little lime, carbonate of lime, or other alkaline matter is mixed with the water in said vessel to absorb and remove any sulphurous acid which may be present and which would injure the apparatus and materials. One pound of lime is sufficient for ten thousand cubic feet of gas. The carbonic acid is forced through the liquid in the vats until it is found that the decomposition in the lower vat of the sulphuret of sodium into carbonate of soda is complete, and which is easily known by suitable chemical tests, when it may be drawn off to be filtered and evaporated in the usual manner. The liquor in the upper vat is then to be brought into the lower vat and fresh liquor introduced into the upper one, and the process repeated as before. I do not confine myself to this particular arrangement of apparatus, but use any form that will bring carbonic acid into intimate contact with sulphuret of sodium. During the whole process a constant stream of gas is escaping from a pipe in the upper vat, consisting of sulphureted hydrogen, nitrogen, and other gases. The whole of the sulphur originally in the sulphate of soda is contained in the sulphureted hydrogen, which I recover or make into sulphuric acid or other compounds of sulphur by means well known to chemists. In the above process the sulphuret of sodium is decomposed by the carbonic acid into carbonate of soda, which dissolves in the water, and into sulphureted hydrogen, which escapes, as above represented.

If bicarbonate of soda, or "soda saleratus," as it is called when impure, is to be made, the filtered solution of carbonate of soda is boiled down until it separates from the liquor as a crystalline powder, consisting of one equivalent of dry carbonate of soda united with one equivalent of water. Commercial soda-ash or sal-soda may be dissolved in water, if thought desirable, and substituted for the solution spoken of above.

The powder of carbonate of soda, above mentioned, is ladled out of the liquor, drained, and allowed to cool. This is coarsely powdered and spread upon frames, which are piled one upon another in air-tight chambers. When the chambers are full the openings are closed, excepting a vent at the top, and carbonic acid, obtained and purified as before mentioned, is forced into them until the saturation is complete, when the soda will be found to have absorbed a second equivalent of carbonic acid, forming bicarbonate of soda. The frames of bicarbonate are then taken out, dried, and powdered. I have found in practice that a chamber containing three tons of prepared soda will be perfectly saturated by sixty hours running of a pump throwing three hundred cubic feet of gas per minute.

The process generally in use for making soda-ash, and which was heretofore the best, consists in mixing one hundred parts of sulphate of soda with one hundred and twenty parts of carbonate of lime and fifty parts of coal, all in powder, heating the mixture to a white heat for some hours in large furnaces, when double decomposition takes place, forming carbonate of soda and oxysulphuret of lime. The mass is then raked out of the furnace and allowed to cool, powdered coarsely, and dissolved in water. The water extracts about forty per cent. of the weight of the mass. The rest is thrown away as useless. The liquors thus obtained are evaporated to dryness, and if too caustic, which is generally the case, are mixed with coal or sawdust and again heated to redness, by which means the soda becomes saturated with carbonic acid formed from the combustion of the coal. All the sulphur originally contained in the sulphate of soda is now in the insoluble mass, but cannot be extracted so as to pay, and it is therefore lost. In practice from fifty to fifty-five per cent. of the weight of sulphate of soda used is obtained as carbonate. It should yield seventy-five per cent., but from the high heat and imperfect decomposition the rest by this process is unavoidably lost.

The advantages of my process over the old plan, above described, are—

First. Not employing carbonate of lime in any form, ten tons of which, at least, are used in the old plan to every seven tons of soda-ash made, the cost of which is considerable, requires to be powdered, and, being very hard, is necessarily expensive.

Secondly. Requiring less than half the weight of matter to be heated, furnaces of half the size will hold it, consuming therefore only half the fuel in heating them, and as a much lower temperature for a shorter time will suffice to effect the decomposition another great saving is produced. These causes combined effect in my process a saving of nearly seventy-five per cent. in fuel.

Thirdly. It enables most, if not all, of the sulphur in the sulphate of soda to be recovered at no expense but the running of the apparatus, which sulphur constitutes twenty per cent. of the cost of soda-ash by the old process.

Lastly. The yield of soda-ash is greater and its quality better, a great loss occurring in the old plan by sublimation by the high heat from the furnaces and by incomplete extraction of the soda from the great insoluble mass; but in my process all is soluble except a small amount of coal used in excess, and it is not rendered impure by lime and other foreign matters, as in the old plan.

The carbonates of potash may be manufactured by a process and treatment precisely the same as above described in my method of manufacturing the carbonates of soda by using the sulphate of potassa instead of the sulphate of soda.

Having thus fully described my invention and the means by which the same may be reduced to practice, what I claim therein as new, and desire to secure by Letters Patent, is—

1. The process of making soda-ash by heating the mixture of sulphate of soda and carbonaceous matters without the use of lime or any other foreign matters as preparatory to converting the same into other products, substantially as described.

2. The process of treating the aqueous solution of the above-heated products by carbonic acid, then boiling to dryness to form a monohydrated carbonate of soda, to be treated again in the dry state by carbonic acid to form bicarbonate of soda, as set forth in the specification.

HENRY PEMBERTON.

Witnesses:
JOHN STEWARDSON,
J. MITCHELL.